Dec. 14, 1937.  C. G. KRONMILLER  2,102,324
CONTROL SYSTEM
Filed June 22, 1935  2 Sheets-Sheet 1

Inventor
Carl G. Kronmiller
By George H Fisher
Attorney

Dec. 14, 1937.  C. G. KRONMILLER  2,102,324
CONTROL SYSTEM
Filed June 22, 1935   2 Sheets-Sheet 2
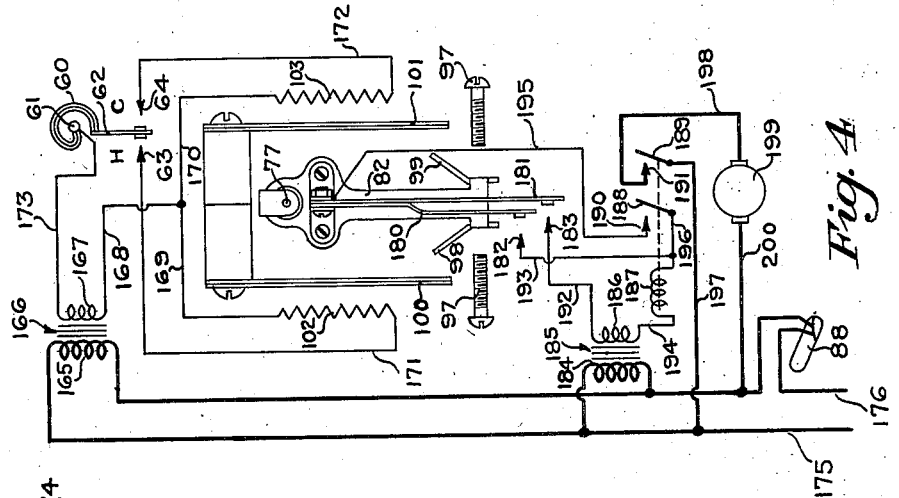
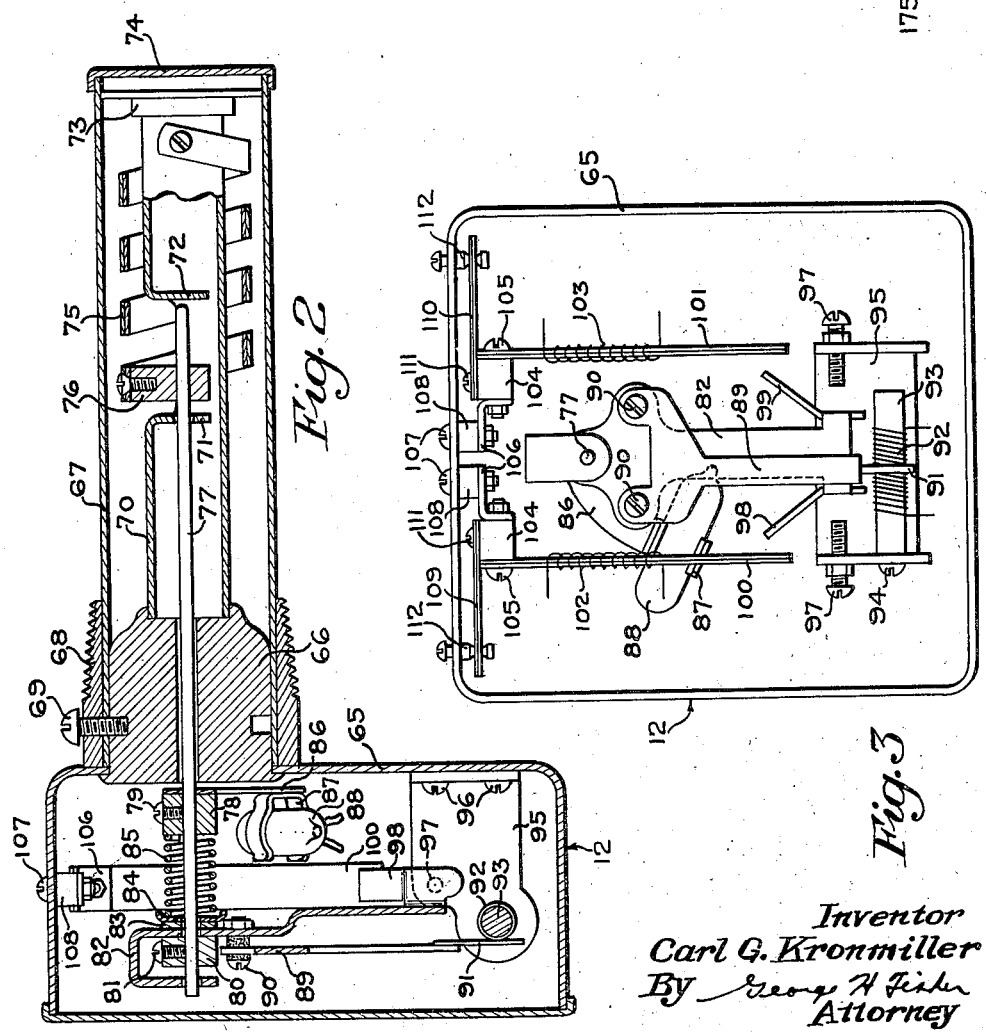
Inventor
Carl G. Kronmiller
By George H Fisher
Attorney Patented Dec. 14, 1937

2,102,324

UNITED STATES PATENT OFFICE 2,102,324

CONTROL SYSTEM

Carl G. Krommiller, Minneapolis, Minn., assignor to Minneapolis-Honeywell Regulator Company, Minneapolis, Minn., a corporation of Delaware Application June 22, 1935, Serial No. 27,956

26 Claims. (Cl. 236—9)

The present invention relates to an improved automatic control system having particular utility in connection with the control of heating devices but also having utility for controlling any condition or force changing device. This invention is an improvement on an invention disclosed and claimed in application Ser. No. 753,783 filed by Arthur C. Grant on November 19, 1934.

One of the objects of the invention is the provision of a control system in which a condition or force changing device is operated intermittently under the control of mechanism actuated in response to changes in the value of a condition or force, preferably produced directly by the condition or force changing device, as distinguished from mechanism which responds to actual values of the condition or force when some other condition or force is such as normally to require operation of the condition or force changing device.

Another object of the invention is the provision of a control system for controlling a condition or force changing device in response to changes in the value of a condition or force produced by the condition or force changing device or in response to changes in the effectiveness of the condition or force changing device when the value of some other condition or force is intermediate; and varying the operation of the condition or force changing device when the value of said other condition or force rises above or falls below said intermediate value.

A further object of the invention is the provision of an automatic control system for controlling a condition or force changing device in which there is provided mechanism responsive to changes in a condition of the condition or force changing device or responsive to changes in the effectiveness thereof, as distinguished from responsiveness to the actual value of the condition or force or its effectiveness, for gradually varying the operation of the condition or force changing device; together with means responsive to some other condition or force for permitting such operation by said mechanism when the value of such other condition or force is at one value and for preventing such operation when said other condition or force is at some other value. Also, preferably, the arrangement is such as to cause operation of the condition or force changing device when said other condition or force is at still another value.

In the preferred form of the invention, the mechanism responsive to changes in the condition of the condition or force changing device produces modulating control, whereas the means responsive to said other condition causes minimum operation of the condition or force changing device when said other condition is at one value, causes maximum operation of said condition or force changing device when the value of said other condition is at a second value, and permits such modulation of said condition or force changing device when the value of said other condition is intermediate said two values.

A further object of the invention is the provision of an electrical system of automatic control including a condition or force responsive element which closes first and second switches upon rise and fall in a condition or force to predetermined values, both said switches being open for intermediate values of said condition or force, the arrangement being such that a condition or force changing device is operated at maximum capacity upon closure of one of said switches and is operated at minimum capacity upon closure of the other of said switches, and there being other means responsive to changes in the effectiveness of the condition or force changing device or responsive to changes in some condition or force produced by the condition or force changing device for controlling the condition or force changing device when both said switches are open.

The means responsive to changes in the effectiveness of the condition or force changing device or responsive to changes in some condition or force produced by the condition or force changing device takes the form of a variable resistance means but may also take the form of a switching mechanism which is closed upon a decrease in such effectiveness of the condition or force. The provision of these means also constitutes objects of the invention.

Another object of the invention is the provision of a pair of oppositely acting electrical devices for controlling a condition changing device, together with a current controlling mechanism operated by a pair of means for changing the respective energizations of the devices, one of the means responding to changes in one condition whereas the other of the means responds to actual values of another condition. One of the means controlling the mechanism preferably takes the form of a slip friction device responsive to changes in one condition and the other means preferably taking the form of a thermal electric device responsive to actual values of another condition.

Still another object of the invention is the provision of means responsive to changes in the value of a condition which is directly produced by a condition changing device for controlling the control means which in turn operate the condition changing device to maintain the condition at its prevailing value, together with mechanisms mechanically associated with the means to prevent the same from controlling the control means along with means responsive to another condition for controlling the mechanism.

Further objects of the invention will be found in the drawings, detailed description and claims.

For a more complete understanding of the invention, reference may be had to the following description and accompanying drawings in which are shown two of the many forms which the invention may take, and in which:

Fig. 2 is a sectional view of one form of a current controlling mechanism which may be used in the system of Fig. 1.

Fig. 3 is a front view of the current controlling mechanism of Fig. 2 with the cover removed.

Fig. 4 is a diagrammatic showing of a modified form of the invention.

Figure 1:
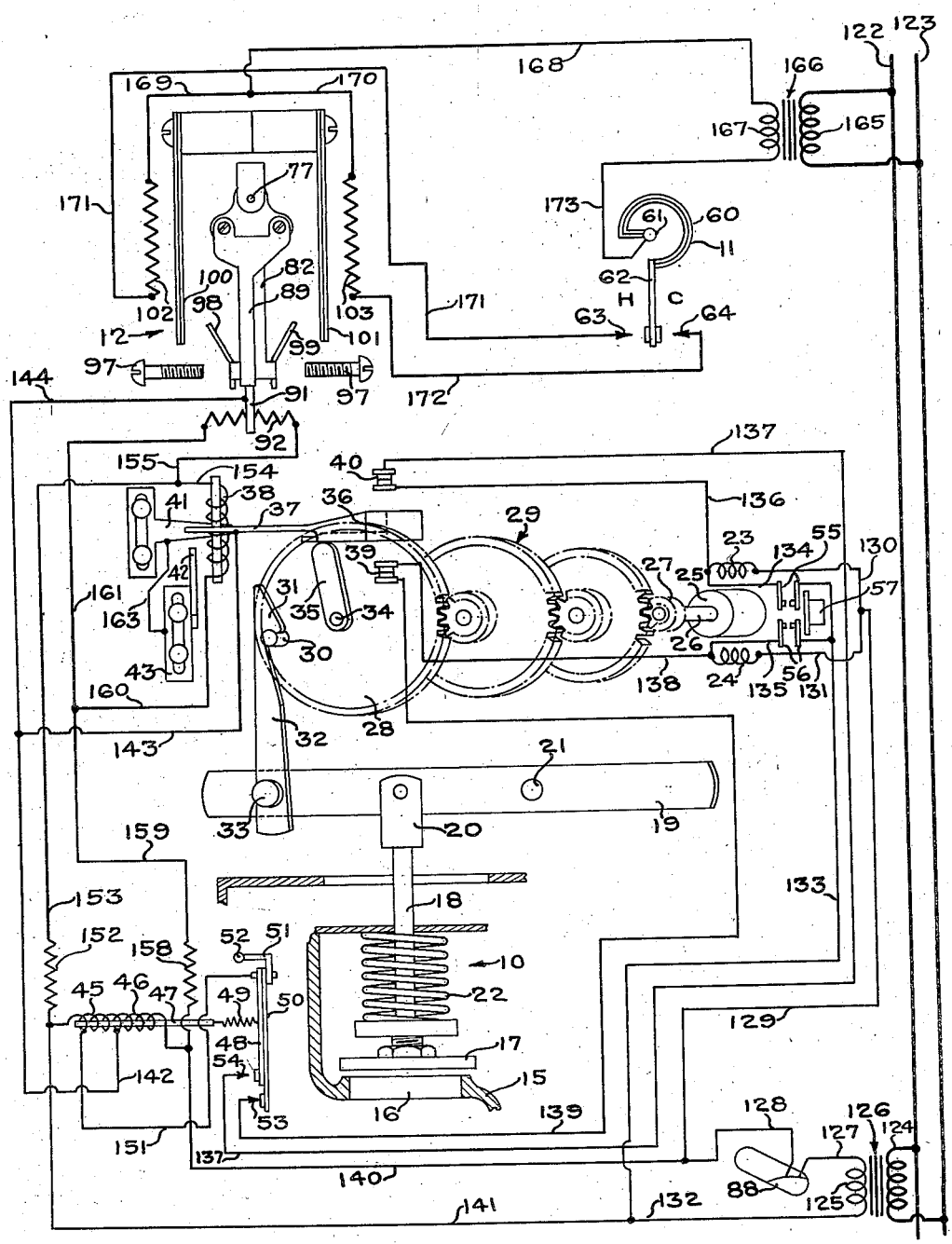
Fig. 1 is a schematic showing of one form of the present invention.

Referring first to Fig. 1 of the drawings, a condition or force changing device is herein diagrammatically shown as comprising an electrically operated valve generally indicated at 10 which may control the flow of gas to a gas-fired hot water boiler. The valve 10 is controlled by a condition or force responsive device herein shown as a room thermostat generally indicated at 11. The valve 10 is further controlled by a device generally indicated at 12 which responds to changes in a condition or force produced by the condition or force changing device 10 or responds to changes in the effectiveness of this condition or force changing device as distinguished from one that responds to the actual values of such condition or force or effectiveness thereof.

The electrically operated valve 10 includes a valve casing 15 (only partially shown herein) which is provided with the usual valve opening 16 that is adapted to be closed by a valve disc 17. The valve disc 17 is carried by a valve stem 18 which is pivoted to a lever 19 by means of a bracket 20. Lever 19 is pivoted at a point indicated at 21. The valve disc 17 is biased to closed position by a spring 22. The valve disc 17 is adapted to be moved to open position against the bias of spring 22 by means of a motor comprising a pair of field windings 23 and 24 which operate a motor rotor 25 mounted upon a rotor shaft 26. A pinion 27, which is carried by rotor shaft 26, is adapted to drive a main gear 28 through suitable reduction gearing generally indicated at 29. The main gear 28 carries a crank pin 30 which, upon clockwise rotation of main gear 28, is adapted to engage the hooked end 31 of a link 32 which is pivoted to lever 19 at a point indicated at 33. The main gear 28 is secured to a shaft 34 which also carries an operator 35. Upon clockwise rotation of main gear 28, the operator 35 engages and lifts an assembly 36 which includes a balancing contact finger 37 that is adapted to engage a balancing resistance 38. The initial upward movement of assembly 36 allows a limit switch 39 to move to closed position, and when the valve has been moved to full open position, the assembly 36 opens a similar limit switch 40. The under side of balancing resistance 38 is engaged by an adjustable contact finger 41 which, in the present showing of the invention, is engaging the mid-portion of balancing resistance 38. The balancing contact finger 37, when moved downwardly, is adapted to ride upon a cam surface 42 formed on an adjustable bracket 43 by means of which the balancing contact finger 37 is lifted off of the balancing resistance 38. With the parts adjusted as shown, the balancing contact finger 37 cannot engage the lower quarter of balancing resistance 38.

The valve 10 is controlled by a balanced relay mechanism comprising a pair of solenoid windings 45 and 46 which are of equal power and control a plunger 47. Plunger 47 is connected to a relatively stiff switch arm 48 through a coiled spring 49. This relatively stiff switch arm 48 and the flexible switch arm 50 are secured to a bracket 51 which is pivoted at 52. The flexible switch arm 50 is adapted to engage a contact 53 whenever plunger 47 is in its central position by reason of solenoid windings 45 and 46 being equally or substantially equally energized. When solenoid winding 45 is the more highly energized, then the plunger 47 moves to the left to a further degree and brings stiff switch arm 48 into engagement with contact 54. Similarly, when solenoid winding 46 is the more highly energized, then plunger 47 moves to the right of the position shown in the drawings, and flexible switch arm 50 disengages contact 53.

The valve 10 also includes a recycling switching mechanism comprising two pairs of cooperating switch arms indicated at 55 and 56. These pairs of switch arms are adapted to be moved to closed circuit position upon manipulation of a manually operable member 57 which at the same time is operable to hold the valve disc 17 in a partial open position after having been manually moved thereto upon the occurrence of a power failure, as is well-known in the art. For further details of the construction of valve 10 and its general operation, reference may be had to the co-pending application of Lewis L. Cunningham, Serial No. 697,686 which was filed November 11, 1933.

The room thermostat 11 comprises a coiled bimetallic element 60 having one of its ends secured to a post 61. The other end of bimetallic element 60 controls a contact blade 62. When the room temperature to which bimetallic element 60 responds rises to some predetermined high value of say 72° F., contact blade 62 moves into engagement with a contact 63, and when the room temperature falls to some lower value, say 70° F., the contact blade 62 moves into engagement with a contact 64. For temperatures intermediate 70° F. and 72° F., the contact blade 62 is intermediate the contacts 63 and 64, as shown in Fig. 1.

Turning now to Figs. 2 and 3 of the drawings, the mechanism 12 comprises a casing 65 which is provided with a circular opening in its rear wall. A plug member 66, having a longitudinal opening therethrough is rigidly secured against rotation in the rear wall of the casing 65. Mounted on the plug 66 is a tubular member 67 and mounted on the tubular member 67 is a screw threaded mounting sleeve 68. The mounting sleeve 68 and the tubular member 67 are held rigid with the plug 66 by means of a screw 69. Rigidly secured to the plug 66, as by soldering, is a tubular member 70 having downturned portions 71 and 72. The outer extremity of the tubular member 70 is secured to a spacer 73 which coacts with the tubular member 67 to support the outer end of the tubular member 70. The open end of the tubular member 67 is closed by a cap 74 secured thereto as by soldering. A bimetallic coil 75 surrounds the tubular member 70 and one end thereof is secured to the tubular member 70 and the other end is secured to a collar rigidly mounted on a torsion rod 77. The torsion rod 77 extends through an opening in the downturned portion 71. The end of the torsion rod 77 abuts against the downturned portion 72 and the collar 76 is adapted to abut against the downturned portion 71 thereby limiting longitudinal movement of the torsion rod 77. The torsion rod 77 extends through the plug 66 and terminates within the casing 65.

Rigidly secured to the torsion rod 77 by means of a screw 79 is a collar member 78 so that upon rotation of the torsion rod 77, the collar 78 is rotated. Also located on the torsion rod 77 and spaced from the collar 78 is another collar 80 which is rigidly secured to the torsion rod 77 by a screw 81. Located between the two collars 78 and 80 are a lever 82, a friction washer 83, a spring holder 84 and a spring 85. The spring 85 abuts against the collar 78 to frictionally engage the lever 82 between the friction washer 83 and collar 80. Therefore, when the torsion rod 77 is rotated, the lever 82 is likewise rotated but if rotation of the lever 82 is stopped, the torsion rod 77 may rotate with respect thereto. The collar 78 carries a lever 86 upon which is mounted a mercury tube high limit switch 88 by means of a mercury tube clip 87.

Secured to the lever 82 by means of screws 90 but insulated therefrom is an arm 89 which carries a slider or contact finger 91. The slider 91 is adapted to engage and slide across a resistance coil 92 mounted on a spool 93. The spool 93 is mounted by means of a screw 94 to a support 95 which is in turn secured to the rear wall of casing 65 by means of screws 96. The support 95 also carries adjustable stops 97 which are adapted to be engaged by the lever 82.

In operation, the bimetallic helix 75 is adapted to be subjected to some heater condition such, for instance, as the temperature of the hot water in a hot water boiler. It will be noted that the lever 86 and consequently the mercury tube switch 88 are directly secured to the torsion rod 77 and move in conformity therewith so that when a predetermined high temperature affects the bimetallic helix 75 to rotate the torsion rod 77 in a counter-clockwise direction as viewed in Fig. 3, the mercury switch 88 will be moved to open contact position. Therefore, the mercury switch 88 is adapted to perform a high limit function as will be set out more fully hereafter. As viewed in Fig. 3, the contact finger or slider 91 is located midway of the resistance coil 92 and upon an increase in temperature affecting the bimetallic helix 75, the slider 91 is moved to the right and upon a decrease in temperature, the slider 91 is moved to the left. If the temperature affecting the bimetallic helix 75 increases more than a predetermined amount, the lever 82 abuts against the adjustable stop 97 to prevent further counter-clockwise movement thereof and to cause slipping between the torsion rod 77 and the lever 82. Likewise, if the temperature affecting the bimetallic helix 75 decreases more than a predetermined amount, the lever 82 abuts the other adjustable stop 97 and the torsion rod 77 moves with respect to the lever 82. From this it follows that a predetermined differential in temperature is required to move the slider 91 across the resistance coil 92 but due to the slip friction connection between the lever 82 and the torsion rod 77, the differential in temperature may occur at any temperature value. Therefore, the slider 91 is moved in response to changes in a condition or force and not in response to the actual value of the condition itself. However, the mercury switch 88 is moved in response to the actual value of the condition.

Referring specifically to Fig. 3, the lever 82 is provided with upwardly and outwardly extending abutments 98 and 99. Spaced from these abutments 98 and 99 are two bimetallic elements 100 and 101, respectively, which are secured to plugs 104 by means of screws 105. The screws 105 also secure the plugs 104 to resilient brackets 106 which are secured to and spaced from the top wall of casing 65 by means of screws 107 and spacers 108. Also mounted on the plugs 104 by means of screws 111 are bimetallic elements 109 and 110. The outer ends of these bimetallic elements 109 and 110 are secured to adjustable anchors 112. Electric heaters 102 and 103 are positioned adjacent to or around the bimetallic elements 100 and 101, respectively. When the heater 102 is energized, the bimetallic element 100 flexes inwardly to engage the abutment 98 to move the slider 91 to the extreme right of potentiometer coil 92. In a like manner, when the heater 103 is energized, the bimetallic element 101 flexes to engage the abutment 99 to move the slider 91 to the extreme left of the potentiometer coil 92. The bimetallic elements 109 and 110 associated with the bimetallic elements 100 and 101, respectively, operate in opposition to bimetallic elements 100 and 101 to prevent movement of the lower ends of the bimetallic elements 100 and 101 with respect to the abutments 98 and 99 upon changes in ambient temperature existing within the casing 65. Specifically, upon an increase in ambient temperature, the centers of the bimetallic elements 109 and 110 are bowed upwardly and by reason of the resilient brackets 106, the bimetallic elements 100 and 101 are swung outwardly. The amount of outward movement of the bimetallic elements 100 and 101 as caused by the ambient temperature affecting the bimetallic elements 109 and 110 is equal to the inward movement of the bimetallic elements 100 and 101 caused by the ambient temperature flexing these elements, therefore, regardless of the ambient temperature within the casing 65, the lower extremities of the bimetallic elements 100 and 101 are maintained in the same position.

Referring now to Fig. 1, line wires 122 and 123 leading from some source of power, not shown, are designated at 122 and 123. A primary 124 of a step-down transformer 126, having a secondary 125 is connected across the line wires 122 and 123. One end of the secondary 125 is connected to one of the electrodes of high limit switch 88 by means of a wire 127. The other electrode of high limit switch 88 is connected by wires 128, 129, 130 and 131 to one end of each of field windings 23 and 24. The other side of the secondary 125 is connected to the recycling switches 55 and 56 by means of wires 132 and 133. These recycling switches 55 and 56 are also connected to the other end of secondary windings 23 and 24 by means of wires 134 and 135. This same end of the field winding 23 is connected to contact 54 through the limit switch 40 by means of wires 136 and 137 and the same end of field winding 24 is connected to contact 53 through the limit switch 39 by means of wires 138 and 139. One side of secondary 125 is also connected to one end of the solenoid coil 46 by means of wire 127, high limit switch 88, wire 128, and wire 140, while the other side of the secondary 125 is connected to one end of solenoid winding 45 by wires 132 and 141. The junction of solenoid windings 45 and 46 is connected to the balancing contact finger 37 and to the slider or contact finger 91 by means of wires 142, 143 and 144. The switch arms 48 and 50 are connected to a small number of turns of solenoid winding 25 by a wire 151. One end of solenoid winding 45 is connected to one end of the balancing resistance 38 and one end of the potentiometer coil 92 through a protective resistance 152 by means of wires 153, 154 and 155. Similarly, one end of solenoid winding 46 is connected to the other end of balancing resistance 38 and the other end of potentiometer coil 92 through a protective resistance 158 by means of wires 159, 160 and 161. Bracket 43 is connected to contact finger 41 by means of wires 163.

A primary 165 of a step-down transformer 166, having a secondary 167 is connected across the line wires 122 and 123. One end of secondary 167 is connected to one end each of the electric heaters 102 and 103 by means of wires 168, 169 and 170. The other end of the electric heater 102 is connected by a wire 171 to the contact 63 and the other end of the electric heater 103 is connected by a wire 172 to the contact 64. The post 61 of the thermostat 11 is connected by a wire 173 to the other end of the secondary 167.

With the parts in the position shown in Fig. 1, the room temperature is intermediate 70° and 72° since contact blade 62 is intermediate contacts 63 and 64. The boiler temperature is likewise intermediate and the contact finger or slider 91 is shown engaged with the mid portion of the resistance coil 92. As a result, the balancing contact finger 37 is engaged with the mid portion of balancing resistance 38 and the solenoid windings 45 and 46 are substantially equally energized so that flexible switch arm 50 is engaged with contact 53. The valve is therefore half open and is held in half open position by reason of energization of field winding 24, the circuit for which is as follows: secondary 125 of transformer 126, wire 127, mercury switch 88, wire 128, wire 129, wire 131, field winding 24, wire 138, limit switch 39, wire 139, contact 53, flexible switch arm 50, wire 151, a small number of turns of solenoid winding 45, wire 141 and wire 132 back to the secondary 125. The flow of current through the small number of turns of solenoid winding 45, upon engagement of flexible switch arm 50 with contact 53, increases the contact pressure between the flexible switch arm 50 and the contact 53 as will become apparent hereinafter. It should be pointed out here that the two field windings 23 and 24 operate rotor 25 in the same direction wherein one of these field windings when energized is capable of holding valve disc 17 in any position to which it is moved against its biasing spring 22 and the energization of both of these field windings at the same time is sufficient to lift the valve disc 17 against the bias of spring 22.

As long as the room temperature remains intermediate 70° and 72°, small fluctuations in boiler temperature will result in movement of the contact finger or slider 91 along resistance coil 92. Assuming there is a slight fall in boiler temperature so that the contact finger 91 moves along resistance coil 92 toward the left hand end thereof, the voltage drop across solenoid winding 45 will be increased and the voltage drop across solenoid winding 46 will be decreased whereupon plunger 47 will move further to the left flexing switch arm 50 and bringing switch arm 48 into engagement with contact 54. Field winding 23 will then be energized as follows: secondary 125, wire 127, high limit switch 88, wire 128, wire 129, wire 130, field winding 23, wire 136, limit switch 40, wire 137, contact 54, switch arm 48, wire 151, a small number of turns of solenoid winding 45, wire 141 and wire 132 back to the secondary 145. This second circuit through the small number of turns of solenoid winding 45 will increase the contact pressure between switch arm 48 and contact 54. Energization of field winding 23 will cause rotation of motor rotor 25 in such direction as to rotate main gear 28 in a clockwise direction to raise further the valve disc 17, it being remembered that field winding 24 is still energized. Such clockwise rotation of main gear 28 also moves balancing contact finger 37 upwardly along balancing resistance 38 and this movement continues until such time as the voltage drops across solenoids 45 and 46 are again substantially equalized whereupon plunger 47 will return to the position shown in Fig. 1 of the drawings wherein switch arm 48 is disengaged from contact finger 54 but flexible switch arm 50 is engaged with contact 53. The field winding 23 is thereby deenergized but the field winding 24 remains energized. As heretofore explained, this single field winding is not sufficient to raise the valve so the opening movement of the valve ceases but this energization of field winding 24 maintains the valve in its new position. In the event the boiler temperature continues falling until contact finger 91 reaches the left hand end of resistance coil 92, then the valve disc 17 will open fully, the assembly 36 will engage the upper arm of limit switch 40 and open the same to deenergize field winding 23 whereby the valve will be held in its full open position by the energization of field winding 24.

Whenever the boiler temperature rises, the contact finger 91 will move along resistance coil 92 toward the right hand end thereof, thereby increasing the voltage drop across solenoid winding 46 and decreasing the voltage drop across solenoid winding 45. Under these conditions, flexible switch arm 50 is moved from engagement with contact 53 whereupon field winding 24 is deenergized as well as field winding 23. The valve disc 17 is therefore moved towards closed position under the bias of spring 22. At the same time, counter-clockwise rotation of the actuator 35 allows balancing contact finger 36 to move downwardly along balancing resistance 38 until a point is reached wherein the voltage drops across solenoid windings 45 and 46 are again equal and flexible switch arm 50 is moved into engagement with contact 53. When this occurs, the field winding 24 is again energized to prevent further closing movement of the valve under the bias of its spring 22. Also, the resulting current flows through the small number of turns of solenoid 45 by the circuit heretofore described and increases the contact pressure between flexible switch arm 50 and contact 53 to prevent chattering of the contacts.

As the boiler temperature continues to drop, this action will be repeated until the contact finger 37 rides up the cam surface 42 at which time balancing contact finger 37 will be moved from engagement with the balancing resistance 38. When this occurs, the balancing contact finger 37 is electrically connected to the center of balancing resistance 38 by the contact finger 41 and wire 163. Inasmuch as the contact finger 91 is near the right hand end of resistance coil 92 at this time which would require movement of balancing finger 37 near the lower end of balancing resistance 38 to rebalance the energizations of solenoid windings 45 and 46, it will be impossible to rebalance these energizations whereby flexible switch arm 50 will remain disengaged from contact 53 and the valve will move to fully closed position. In this manner, when the valve reaches some minimum position during closing movement the valve completely closes, thereby eliminating danger of a pop-back into the furnace by reason of the burner's being unable to handle such a small flow of gas. Movement of the valve to its fully closed position under the bias of spring 22 imparts sufficient momentum to the main gear 28, the motor rotor 25 and the gear reduction 29 to cause these parts to rotate a small amount after the valve disc 17 becomes seated wherefore the crank pin 30 moves a small distance away from the hooked end 31 of the link 32. Also, the assembly 36 moves the lower arm of limit switch 39 and opens the same thereby preventing energization of field winding 24.

Now if the boiler temperature again rises so that the contact finger 91 moves along resistance coil 92 towards the left hand end thereof, solenoid winding 46 will remain more highly energized than solenoid winding 45 until the contact finger 96 reaches the middle of resistance coil 92. This is because balancing contact finger 37 is now electrically connected to the center of balancing resistance 38 by the contact finger 41 and wire 163. When the contact finger 91 reaches the middle of resistance coil 92 so that the solenoids 45 and 46 are equally energized, flexible switch arm 50 will be moved into engagement with contact 53 but field winding 24 will not be energized since limit switch 39 is opened. Upon movement of contact finger 91 past the center of resistance coil 92 toward the left hand end thereof due to further lowering of the boiler temperature, the voltage drop across solenoid winding 45 will become larger than the voltage drop across solenoid winding 46 whereupon switch arm 48 moves into engagement with contact 54 and energizes field winding 23 in the manner heretofore described. This energization of field winding 23 will be sufficient to rotate main gear 28 in a clockwise direction and bring crank pin 30 into engagement with hooked link 33 since during this time there is substantially no load upon the motor. Such movement of main gear 28 lifts assembly 36 a slight amount through actuator 35 so that limit switch 39 closes whereupon field winding 24 is also energized. The energization of field windings 23 and 24 continues rotation of main gear 28 whereupon valve disc 17 is raised against the resistance of its spring 22. The valve will therefore be raised to a little more than half open position in order to bring balancing contact finger 37 slightly past the center portion of balancing resistance 38 in order to rebalance the voltage drops across solenoid windings 45 and 46 so as to disengage switch arm 48 from contact finger 54 in the manner heretofore described. During this upward movement of balancing contact finger 37, it rides off the cam surface 42 whereupon the contact finger 41 and wire 163 no longer electrically connect balancing contact finger 37 to the mid portion of balancing resistance 38. It will therefore be noted that when the valve is closed, it can only be open when the demand for heat is sufficiently great as to result in a relatively large opening of the valve. In this manner, a relatively large initial flow of gas is supplied to the burner so as to prevent a flare back into the mixer. The amount of initial opening can be varied by varying the position of contact finger 41 along balancing resistance 38.

From the above, it will be seen that whenever the room temperature is intermediate, the contact finger 91 and its associated resistance coil 92 will modulate the position of the valve disc 17 to maintain the boiler temperature at whatever value it may happen to be. Now if the room temperature should rise so as to bring contact blade 62 into engagement with contact 63, a circuit is completed from the secondary 167 of step-down transformer 166 through wire 173, post 61, thermostat 60, blade 62, contact 63, wire 171, heater 102, wire 169 and wire 168 back to the secondary 167. Completion of this circuit causes energization of heater 102 to flex the bimetallic element 100 inwardly. The bimetallic element 100 thereby engages the abutment 98 to move the contact finger 91 to the right hand end of the resistance coil 92. Movement of contact finger 91 to the right hand end of resistance coil 92 short-circuits the solenoid winding 45 whereby the flexible switch arm 50 is moved out of engagement with the contact 53 to deenergize the field windings 23 and 24 to permit the spring 22 to close the valve disc 17. In this manner, a rise in room temperature to or above 72° causes positive closing movement of valve disc 17 and prevents the further supply of heat to the room. When the room temperature decreases to a value less than 72° as a result of stopping the supply of heat to the room, the thermostat 11 will assume a position shown in Fig. 1 to break the circuit of the electric heater 102 to allow the bimetallic element 100 to disengage abutment 98. Due to the fact that the room thermostat 11 has shut off the supply of heat to the boiler, the boiler temperature will drop and as the boiler temperature so drops, the contact finger 91 is moved towards the left across the resistance coil 92. When the contact finger 91 has moved just beyond the mid position of the resistance coil 92 in a manner described hereabove, the solenoid winding 45 is energized more than the solenoid winding 46 to move the switch arms 48 and 50 into engagement with the contacts 54 and 53 to energize the field windings 23 and 24 to lift the valve disc 17 from its seat and thereby supply fuel to the boiler. The valve 17 will then remain under the control of instrument 12 to maintain the boiler temperature at the value at which the room thermostat 11 was satisfied. By reason of the control of the boiler by the instrument 12 in this manner to maintain the temperature of the boiler at this new value, the room temperature will be maintained between 70° and 72°.

If the room temperature should fall below 70°, the bimetallic element 60 moves the blade 62 into engagement with the contact 64 to complete a circuit from the secondary 167 of the step-down transformer 166 through wire 173, post 61, bimetallic element 60, blade 62, contact 64, wire 172, heater 103, wire 170, and wire 168 back to the secondary 167. Completion of this circuit causes energization of the electric heater 103 which flexes the bimetallic element 101 into engagement with abutment 99 to move the contact finger 91 to the left hand end of the resistance coil 92. Movement of contact finger 91 to the left hand end of resistance coil 92 causes short-circuiting of the solenoid winding 46 to move the switch arms 48 and 50 into engagement with the contacts 54 and 53. This causes energization of both field windings 23 and 24 in the manner above described to completely open the valve disc 17.

Complete opening of the valve disc 17 raises the temperature of the boiler and supplies more heat to the room. When the temperature of the room has risen above 70° by reason of this additional supply of heat, the blade 62 moves out of engagement with the contact 64 to deenergize the heater 103 to move the bimetallic element 101 out of engagement with the abutment 99. After the room thermostat has been satisfied, the boiler temperature will continue to rise and move the contact finger 91 from its left hand position toward the right. Movement of the contact finger 91 towards the right, increases the voltage drop across the solenoid winding 46 to move the switch arms 48 and 50 from engagement with the contacts 54 and 53 to deenergize the field windings 23 and 24 to move the valve disc 17 away from its full open position to an intermediate position to decrease the temperature of the boiler water. The valve disc 17 and therefore the temperature of the boiler is placed under the control of instrument 12 and the boiler water temperature is maintained at substantially this new temperature value. In this manner, the room temperature is maintained between 70° and 72°.

If the temperature of the boiler should become excessive, then high limit mercury switch 88 is tilted to an off position to break circuit to the valve motor and cause deenergization of the field windings 23 and 24 whereupon the spring 22 moves the valve disc 17 to a closed position until the temperature of the boiler decreases below the high limit value. When the temperature of the boiler decreases to normal, the mercury switch 88 is tilted to circuit making position and the normal mode of operation outlined above is continued.

From the above it is seen that when the room temperature is below a predetermined value, the valve disc 17 is opened to completely energize the boiler to supply heat to the room and that when the room temperature rises above a predetermined high value, the valve disc 17 is closed to deenergize the boiler and prevent the further supply of heat to the room. It is also seen that when the room temperature is intermediate these two predetermined values, the valve is under the control of instrument 12 and responds to changes in the temperature of the boiler so that the boiler is maintained at a temperature which will maintain the room temperature between the predetermined room temperature values.

Referring now to Fig. 4, I have shown a modified form of my invention wherein the motor for operating a valve is intermittently energized and deenergized to intermittently open and close the valve instead of modulating the valve as in the previous modification. In this modification, the instrument responding to changes in boiler temperature is identical with that in the previous modification with the exception that the instrument operates open contact switches instead of a contact finger cooperating with a resistance coil. The instrument responding to changes in boiler temperature is also controlled by the room temperature in identically the same manner as in the previous modification.

Line wires 175 and 176, leading from some source of power, not shown, and the transformer 166 supplying energy to the heaters 102 and 103 under the control of the room thermostat is connected across these line wires. A relatively rigid blade 180 and a relatively flexible blade 181 are connected to but insulated from the lever 82 operated in response to changes in boiler water temperature. The rigid blade 180 is adapted to engage a contact 182 and the flexible blade 181 is adapted to engage a contact 183. The distance between the contact 183 and the flexible blade 181 is less than the distance between the contact 182 and the flexible blade 180 so that upon a decrease in temperature, the contact 183 is first engaged by its blade and then the contact 182 by its blade. A primary 184 of a step-down transformer 185 having a secondary 186 is connected across the line wires 175 and 176. A relay coil 187 controls the operation of switch arms 188 and 189 so that upon energization of the relay coil 187, the switch arms 188 and 189 are moved into engagement with contacts 190 and 191, respectively, and upon deenergization of the relay coil 187, the switch arms are moved out of engagement with their respective contacts by means of gravity or springs or other means, not shown. One end of the secondary 186 is connected by a wire 192 to the contact 183 and the contact 182 is connected by a wire 193 to one end of the relay coil 187. The other end of the relay coil 187 is connected by a wire 194 to the other end of secondary 186. The blades 180 and 181 are connected by a wire 195 to the contact 190 and the switch arm 188 cooperating with the contact 190 is connected by a wire 196 to the relay coil 187. The switch arm 189 is connected by a wire 197 to the line wire 175 and the contact 191 cooperating with the switch arm 189 is connected by a wire 198 to a motor 199. The motor 199 is in turn connected by a wire 200 to the line wire 176. The motor 199 may operate a valve so that upon energization of the motor the valve is opened and upon deenergization thereof the valve is closed by means of a biasing means, such as a spring. Such a motor-operated valve is old in the art and a further description thereof is not considered necessary. The motor 199 may also operate an oil burner or a stoker in the manner which is known in the art.

When the boiler temperature decreases, the flexible switch arm 181 is moved into engagement with the contact 183 and upon a further slight decrease in boiler temperature, the rigid switch arm 180 is moved into engagement with the contact 182 to complete a circuit from the secondary 186 through wire 192, contact 183, switch arm 181, switch arm 180, contact 182, wire 193, relay coil 187 and wire 194 back to the secondary 186. Completion of this circuit causes energization of relay coil 187 to move the switch arms 188 and 189 into engagement with the contacts 190 and 191. Movement of switch arm 188 into engagement with the contact 190 completes a holding circuit from the secondary 186 through wire 192, contact 183, blade 181, wire 195, contact 190, switch arm 188, wire 196, relay coil 187 and wire 194 back to the secondary 186 to maintain the relay coil 187 energized until the boiler temperature has increased a sufficient amount to break contact between the contact 183 and the switch arm 181. Movement of switch arm 189 into engagement with contact 191 completes a circuit from the line wire 175 through wire 197, switch arm 189, contact 191, wire 198, motor 199 and wire 200 back to the line wire 176 to cause energization of the motor 199 to open a valve or to operate an oil burner or a stoker. When the boiler temperature has risen a predetermined amount due to the operation of motor 199, the switch arms 180 and 181 are moved out of engagement with contacts 182 and 183 to deenergize the relay 187 to move the switch arm 189 out of engagement with the contact 191 to stop operation of the motor 199 and consequently stop operation of the oil burner or stoker or to cause closing of the valve. Therefore, when the room temperature is between 70° and 72°, the motor 199 is intermittently operated to maintain the boiler water temperature at predetermined values.

As in the previous modification, as the room temperature rises above 72°, the heater 102 is energized to cause the bimetallic element 100 to engage the abutment 98 to open the switch contacts to deenergize the relay 187 to close the fuel valve or stop operation of the fuel burner or stoker. Likewise, when the room temperature decreases below 70°, the heater 103 is energized to cause the bimetallic element 101 to engage the abutment 99 to close the switch contacts to energize the relay coil 187 to open the valve or cause operation of the oil burner or stoker. In this manner, when the room temperature is above a predetermined value, the further supply of heat to the room is prevented and when the temperature is below another predetermined lower value, an additional supply of heat is supplied to the room. When the room temperature is between these two predetermined values, the supply of heat to the room is maintained at a value which is sufficient to maintain the temperature in the room between these two values.

The high limit switch 88 is shown in this modification to be connected in the line wire 176 so that when an abnormally high temperature exists within the boiler, the supply of energy to the motor and the two transformers 185 and 166 is cut off to prevent operation of any portion of the system.

In both systems, it will be noted that the valve or motor broadly represents a condition or force changing device or temperature changing device and that this condition or force changing device or temperature changing device is controlled by actual values of a condition (such as room temperatures) and by changes in some condition (such as boiler temperature) produced by the condition or force changing device or in accordance with changes in the output or capacity or effectiveness of the condition or force changing device. In the preferred system, the means which is responsive to changes in the condition or force or effectiveness or capacity or output operate to modulate the action of the condition or force changing device. It will also be noted that the systems of the present invention are so arranged that a room thermostat having three positions, namely, a first position in which one contact is made, a second position wherein another contact is made, and a third position wherein neither contact is made, and preferably a thermostat of the type which alternately engages a pair of contacts and has an intermediate position, operates a mechanical mechanism which is correlated with another device operative upon changes in the condition or force rather than actual values thereof in such manner that for two of the room thermostat positions it has absolute control and for the third position the device responsive to changes in the condition or force takes control.

Many changes in the details of construction and wiring arrangements may of course be made by those skilled in the art and I therefore intend to be limited only by the scope of the appended claims.

I claim as my invention:

1. In a system of the class described, in combination, a condition changing device, means responsive to changes in the value of a condition which is directly produced by said condition changing device, control means controlled by said means to operate the condition changing device to maintain said condition at its prevailing value, mechanisms mechanically associated with said means to prevent the same from controlling said control means, and means responsive to another condition in control of said mechanism.

2. In a system of the class described, in combination, a condition changing device, means responsive to changes in the value of a condition which is directly produced by said condition changing device, control means controlled by said means gradually to vary the effect of said condition changing device to maintain said condition at its prevailing value, mechanism mechanically associated with said means to prevent the same from operating the control means to vary the effect of said condition changing device, and means responsive to another condition in control of said mechanism.

3. In a system of the class described, in combination, a condition changing device, means responsive to changes in the value of a condition which is directly produced by said condition changing device, control means controlled by said means to operate the condition changing device when the value of said condition lowers a predetermined amount and to stop operation of the condition changing device when the value of said condition rises a predetermined amount, mechanism mechanically associated with said means to prevent the same from operating said control means as a result of changes in said condition, and means responsive to another condition in control of said mechanism.

4. A system of the class described, comprising, in combination, a condition changing device, means responsive to changes in the condition of said condition changing device in control of the condition changing device to control the same to maintain the value of the condition thereof at the particular value prevailing, and mechanism responsive to another condition to prevent response of said means to changes in the first-named condition.

5. A system of the class described, comprising, in combination, a condition changing device, a control member normally moved in accordance with changes in the value of a condition which is affected by the condition changing device, connections between said control member and condition changing device by which the former controls the latter to maintain the condition at the particular value prevailing, mechanism associated with said control member and operative to prevent movement thereof upon changes in said condition, and a condition responsive device in control of said mechanism.

6. A system of the class described, comprising, in combination, a condition changing device, a control member normally moved in accordance with changes in the value of a condition which is affected by the condition changing device, connections between said control member and condition changing device by which the former controls the latter, mechanism associated with said control member and operative to move the same to either of its extreme control positions and maintain it therein irrespective of changes in the value of said condition, and means responsive to another condition in control of said mechanism and operative to move the same to one of its extreme control positions when the value of said second condition rises to a predetermined maximum and to move the same to its other extreme control position when the value of said second condition falls to a predetermined minimum.

7. In combination, a control device operative to change the value of a condition, an element responsive to changes in said condition, a control member coupled to said element through continuously acting non-positive transmission means whereby said control member normally moves in accordance with the movements of said element, connections between said control member and control device by which the former controls the latter, and means responsive to another condition operative to prevent movement of said control member whereby the position of the control member in relation to the position of said element may be changed so that thereafter the control device is controlled to maintain said first condition at a new value.

8. In combination, a control device operative to change the value of a condition, an element responsive to changes in said condition, a control member coupled to said element through continuously acting non-positive transmission means whereby said control member normally moves in accordance with the movements of said element, connections between said control member and control device by which the former controls the latter, and means responsive to another condition operative to move said control member to either of its extreme control positions and maintain the same therein irrespective of changes in said first condition whereby the position of said control member in relation to the position of said element is changed.

9. In combination, a control device operative to change the value of a condition, an element responsive to changes in said condition, a control member coupled to said element through continuously acting non-positive transmission means whereby said control member normally moves in accordance with the movements of said element, connections between said control member and control device by which the former controls the latter, electrical means associated with the control member and selectively energizable to move the control member to one or the other of its extreme control positions and maintain it therein irrespective of changes in the value of said condition, and switching means in control of the energization of said electrical means.

10. In combination, a control device operative to change the value of a condition, an element responsive to changes in said condition, a control member coupled to said element through continuously acting non-positive transmission means whereby said control member normally moves in accordance with the movements of said element, connections between said control member and control device by which the former controls the latter, a pair of heat responsive devices associated with said control member and operative to move the same to one or the other of its extreme control positions, and means to vary the temperature of said heat responsive devices.

11. In combination, a control device operative to change the value of a condition, an element responsive to changes in said condition, a control member coupled to said element through continuously acting non-positive transmission means whereby said control member normally moves in accordance with the movements of said element, connections between said control member and control device by which the former controls the latter, a pair of heat responsive devices associated with said control member and operative to move the same to one or the other of its extreme control positions, electrical means to heat each of said heat responsive devices, and switching means responsive to another condition in control of said electrical heating means.

12. In a conditioning system for conditioning a space to be controlled, in combination, a condition changing device for changing the condition of a fluid for changing the condition of such space, means normally movable in accordance with changes in the condition of said fluid, connections between said means and condition changing device by which the former controls the latter, a pair of heat responsive devices arranged additionally to control said means, a pair of electrical heaters associated with said heat responsive devices, and switching means responsive to the condition of said space in control of the electrical heaters.

13. The combination with a condition changing device for changing the condition of a fluid that in turn varies the condition of a space to be controlled, of a control member in control of said condition changing device, condition responsive means responsive to the condition of said fluid, connections between said means and control member including slip friction transmission means whereby the control member is normally moved in accordance with the changes in such condition, and means responsive to a condition of the space additionally to control the movements of said control member.

14. The combination with a condition changing device for changing the condition of a fluid that in turn varies the condition of a space to be controlled, of a control member in control of said condition changing device, condition responsive means responsive to the condition of said fluid, connections between said means and control member including continuously acting non-positive transmission means whereby the control member is normally moved in accordance with the changes in such condition, and means responsive to a condition of the space to move said control member to one or the other of its extreme positions upon rise and fall of the value of said space condition while permitting movement of said control member by said first condition responsive means when said space condition is at the desired value.

15. The combination with a condition changing device for changing the condition of a fluid that in turn varies the condition of a space to be controlled, of a control member in control of said condition changing device, condition responsive means responsive to the condition of said fluid, connections between said means and control member including slip friction transmission means whereby the control member is normally moved in accordance with the changes in such condition, mechanical means associated with said control member and selectively operable to permit movement thereof or to move the same to one of its extreme control positions and maintain it therein irrespective of changes in the condition of said fluid, and means responsive to a condition of the space in control of said mechanical means.

16. The combination with a condition changing device for changing the condition of a fluid that in turn varies the condition of a space to be controlled, of a control member in control of said condition changing device, condition responsive means responsive to the condition of said fluid, connections between said means and control member including slip friction transmission means whereby the control member is normally moved in accordance with the changes in such condition, electrical means associated with said control member and selectively energizable to permit movement of the control member in response to changes in the value of the condition of said fluid or to move said control member to an extreme position and maintain the same therein irrespective of changes in the condition of said fluid, and current controlling means responsive to changes in a condition of the space in control of said electrical means.

17. The combination with a condition changing device for changing the condition of a fluid that in turn varies the condition of a space to be controlled, of a control member in control of said condition changing device, condition responsive means responsive to the condition of said fluid, connections between said means and control member including slip friction transmission means whereby the control member is normally moved in accordance with the changes in such condition, electrical means associated with said control member and selectively energizable to permit movement of the control member in response to changes in the value of the condition of said fluid or to move said control member to an extreme position and maintain the same therein irrespective of changes in the condition of said fluid, and double circuit switching means responsive to a condition of said space in control of said electrical means.

18. The combination with a condition changing device for changing the condition of a fluid that in turn varies the condition of a space to be controlled, of a control member in control of said condition changing device, condition responsive means responsive to the condition of said fluid, connections between said means and control member including continuously acting non-positive transmission means whereby the control member is normally moved in accordance with the changes in such condition, means including a pair of electrical devices selectively energizable to permit movement of said control member in response to changes in the condition of said fluid or to move said control member to either of its extreme positions and maintain it therein irrespective of changes in the condition of said fluid, and double circuit switching means responsive to a condition of said space in control of said electrical devices.

19. The combination with a condition changing device for changing the condition of a fluid that in turn varies the condition of a space to be controlled, of a control member in control of said condition changing device, condition responsive means responsive to the condition of said fluid, connections between said means and control member including continuously acting non-positive transmission means whereby the control member is normally moved in accordance with the changes in such condition, means including a pair of electrical devices operable to permit movement of said control member in response to changes in the condition of said fluid when both of said devices are deenergized and to move said control member to one or the other of its extreme positions and maintain it therein upon selective energization of said electrical devices, double circuit switching means responsive to a condition of the space connected to said electrical devices to maintain the same deenergized when the space condition is at the desired value and to energize one or the other thereof if the space condition rises above or falls below said desired value.

20. In combination, a device for changing the condition of a fluid for varying the condition of a space to be controlled, a control member associated with said device for controlling the same and movable throughout a given control range, an element responsive to a condition of the fluid, continuously acting non-positive transmission means between the control member and condition responsive element whereby said element may move the control member through its control range upon variations in the condition of said fluid while relative movement between the control member and condition responsive element is permitted, heat responsive means associated with the control member to prevent its movement in its control range, and means responsive to a condition of the space in control of said heat responsive means.

21. In combination, a device for changing the condition of a fluid for varying the condition of a space to be controlled, a control member associated with said device for controlling the same and movable throughout a given control range, an element responsive to a condition of the fluid, continuously acting non-positive transmission means between the control member and condition responsive element whereby said element may move the control member through its control range upon variations in the condition of said fluid while relative movement between the control member and condition responsive element is permitted, heat responsive means associated with the control member to prevent its movement in its control range, electrical means for heating said heat responsive means, and current controlling means responsive to variations in the condition of said space in control of said electrical means.

22. In combination, a device for changing the condition of a fluid for varying the condition of a space to be controlled, a control member associated with said device for controlling the same and movable throughout a given control range, an element responsive to a condition of the fluid, continuously acting non-positive transmission means between the control member and condition responsive element whereby said element may move the control member through its control range upon variations in the condition of said fluid while relative movement between the control member and condition responsive element is permitted, a pair of heat responsive devices associated with said control member and operative to permit the same to move throughout its control range or to move the control member to either extreme of its control range and maintain it therein, and means responsive to a condition of said space in control of said heat responsive devices.

23. In combination, a device for changing the condition of a fluid for varying the condition of a space to be controlled, a control member associated with said device for controlling the same and movable throughout a given control range, an element responsive to a condition of the fluid, continuously acting non-positive transmission means between the control member and condition responsive element whereby said element may move the control member through its control range upon variations in the condition of said fluid while relative movement between the control member and condition responsive element is permitted, a pair of heat responsive devices associated with said control member and operative to permit the same to move throughout its control range or to move the control member to either extreme of its control range and maintain it therein, electrical means for heating said heat responsive devices, and current controlling means responsive to a condition of said space in control of said electrical means.

24. In combination, a device for changing the condition of a fluid for varying the condition of a space to be controlled, a control member associated with said device for controlling the same and movable throughout a given control range, an element responsive to a condition of the fluid, continuously acting non-positive transmission means between the control member and condition responsive element whereby said element may move the control member through its control range upon variations in the condition of said fluid while relative movement between the control member and condition responsive element is permitted, a pair of heat responsive devices associated with said control member and operative to permit the same to move throughout its control range or to move the control member to either extreme of its control range and maintain it therein, separate electrical heaters for said heat responsive devices, and double circuit switching means responsive to a condition of the space in control of said electrical heaters.

25. In combination, a device for changing the condition of a fluid for varying the condition of a space to be controlled, a control member associated with said device for controlling the same and movable throughout a given control range, an element responsive to a condition of the fluid, continuously acting non-positive transmission means between the control member and condition responsive element whereby said element may move the control member through its control range upon variations in the condition of said fluid while relative movement between the control member and condition responsive element is permitted, a pair of heat responsive devices associated with said control member and arranged to permit movement thereof throughout its control range when both said heat responsive devices are relatively cold and to move said control device to one or the other of the limits of its control range upon selective heating of said heat responsive devices, and means responsive to a condition of the space in control of the temperature of said heat responsive devices.

26. In combination, a device for changing the condition of a fluid for varying the condition of a space to be controlled, a control member associated with said device for controlling the same and movable throughout a given control range, an element responsive to a condition of the fluid, continuously acting non-positive transmission means between the control member and condition responsive element whereby said element may move the control member through its control range upon variations in the condition of said fluid while relative movement between the control member and condition responsive element is permitted, a pair of heat responsive devices associated with said control member and arranged to permit movement thereof throughout its control range when both said heat responsive devices are relatively cold and to move said control device to one or the other of the limits of its control range upon selective heating of said heat responsive devices, separate electrical heaters for said heat responsive devices, and double circuit switching means responsive to a condition of said space and connected to said electrical heaters selectively to energize the same as the space condition rises above or falls below a given desired value.

CARL G. KRONMILLER.